(12) United States Patent
Liu et al.

(10) Patent No.: US 10,940,930 B2
(45) Date of Patent: Mar. 9, 2021

(54) ONLINE ANTIFOULING SHIP BALLAST WATER TREATMENT SYSTEM AND SHIP BALLAST WATER TREATMENT METHOD

(71) Applicant: SUNRUI MARINE ENVIRONMENT ENGINEERING CO., LTD., Qingdao (CN)

(72) Inventors: Guangzhou Liu, Qingdao (CN); Dongxia Duan, Qingdao (CN); Ping Yao, Qingdao (CN)

(73) Assignee: SUNRUI MARINE ENVIRONMENT ENGINEERING CO., LTD., Qingdao (CN)

( * ) Notice: Subject to any disclaimer, the term of this patent is extended or adjusted under 35 U.S.C. 154(b) by 582 days.

(21) Appl. No.: 15/574,835

(22) PCT Filed: May 18, 2015

(86) PCT No.: PCT/CN2015/079172
§ 371 (c)(1),
(2) Date: Nov. 16, 2017

(87) PCT Pub. No.: WO2016/183765
PCT Pub. Date: Nov. 24, 2016

(65) Prior Publication Data
US 2018/0148151 A1   May 31, 2018

(30) Foreign Application Priority Data
May 18, 2015   (CN) .......................... 201510252778.6

(51) Int. Cl.
*C02F 1/46*   (2006.01)
*B63J 4/00*   (2006.01)
(Continued)

(52) U.S. Cl.
CPC ............... *B63J 4/002* (2013.01); *C02F 1/004* (2013.01); *C02F 1/20* (2013.01); *C02F 1/4674* (2013.01);
(Continued)

(58) Field of Classification Search
CPC .......... C02F 1/4674; C02F 1/20; C02F 1/004; C02F 2103/08; C02F 2103/008;
(Continued)

(56) References Cited

U.S. PATENT DOCUMENTS

| 4,659,347 A | 4/1987 | Schrems et al. | |
| 2008/0164217 A1* | 7/2008 | Nishizawa | B63J 4/002 210/747.6 |
| 2011/0114569 A1* | 5/2011 | Kim | C02F 1/4674 210/739 |

FOREIGN PATENT DOCUMENTS

| CN | 101068750 A | 11/2007 |
| CN | 101428919 A | 5/2009 |

(Continued)

OTHER PUBLICATIONS

CN-102515400-A translation ; Jun. 2012; Inventor: Fu H; Liu G ; Sun M ; Wang H reatment of ship ballast water . . . (Year: 2012).*

*Primary Examiner* — Cameron J Allen
(74) *Attorney, Agent, or Firm* — Cheng-Ju Chiang

(57) ABSTRACT

An online antifouling ship ballast water treatment system includes a ballast water main pipeline, a ballast water branch pipeline, a dispensing pipeline, a filter on the ballast water main pipeline, an electrolysis unit on the ballast water branch pipeline, and a dispensing pump on the dispensing pipeline. Some of seawater introduced into the system is filtered by the filter and flows to the ballast water branch pipeline and the electrolysis unit, some of seawater electrolyzed by the electrolysis unit is reinjected to the filter through the dispensing pump and the dispensing pipeline
(Continued)

after a ballast process is completed, and kept in the filter until a next ballast operation, so that growth and propagation of marine organisms in the filter can be inhibited by sodium hypochlorite contained in a TRO solution when a ballast pump stops working. The present invention also provides a ship ballast water treatment method.

12 Claims, 2 Drawing Sheets

(51) Int. Cl.
  *C02F 1/467* (2006.01)
  *C02F 1/00* (2006.01)
  *C02F 1/20* (2006.01)
  C02F 103/00 (2006.01)
  C02F 103/08 (2006.01)
(52) U.S. Cl.
  CPC .... *C02F 2103/008* (2013.01); *C02F 2103/08* (2013.01); *C02F 2301/043* (2013.01); *C02F 2303/04* (2013.01); *C02F 2303/20* (2013.01)
(58) Field of Classification Search
  CPC ............ C02F 2301/043; C02F 2303/04; C02F 2303/20; B01D 19/0068; B01D 19/0047; B01D 19/0042; B63B 13/00; B63J 4/002
  See application file for complete search history.

(56) References Cited

FOREIGN PATENT DOCUMENTS

| | | | |
|---|---|---|---|
| CN | 102502926 A | | 6/2012 |
| CN | 102515400 A | | 6/2012 |
| CN | 102515400 A | * | 6/2012 |
| CN | 202379779 U | | 8/2012 |
| CN | 202430075 U | | 9/2012 |
| CN | 103043809 A | | 4/2013 |
| CN | 203451322 U | | 2/2014 |
| CN | 104291458 A | | 1/2015 |
| CN | 104817129 A | | 8/2015 |
| CN | 104817214 A | | 8/2015 |
| CN | 204779177 U | | 11/2015 |
| JP | 2007-229577 A | | 9/2007 |
| JP | 2008-188506 A | | 8/2008 |
| JP | 2009-82844 A | | 4/2009 |
| JP | 2012-246553 A | | 12/2012 |
| KR | 10-2010-0076193 A | | 7/2010 |
| KR | 20100130439 A | * | 12/2010 |
| KR | 10-1062559 B1 | | 8/2011 |
| WO | 2014/129710 A1 | | 8/2014 |

* cited by examiner

ONLINE ANTIFOULING SHIP BALLAST WATER TREATMENT SYSTEM AND SHIP BALLAST WATER TREATMENT METHOD

CROSS REFERENCE TO RELATED APPLICATIONS

This application is a 35 U.S.C. § 371 National Phase conversion of International (PCT) Patent Application No. PCT/CN2015/079172, filed on May 18, 2015, and also claims benefit of Chinese Patent Application No. 201510252278.6, filed on May 18, 2015. The contents of the above-identified applications are incorporated herein by reference. The PCT International Patent Application was filed and published in Chinese.

TECHNICAL FIELD

The present invention relates to ballast water treatment technology for ship, and more particularly to an online antifouling ship ballast water treatment system and ship ballast water treatment method.

BACKGROUND

During the voyage of a ship, ballasting water is necessary. When ballasting, local aquatic organisms are brought into the ballast tank and then discharged to the destination waterway with the ballast water. The ballast water, carried by the ship from one place to another, causes the spread of harmful aquatic organisms and pathogens. In order to effectively control and prevent the spread of harmful aquatic organisms and pathogens, which were caused by the ballast water of ships, International Marine Organization (IMO) adopted the "International Convention for the Control and Management of Ships' Ballast Water Sediments" in 2004. "The Convention" requires all ships to be equipped with ballast water treatment system on schedule and is applicable retroactively to all present ships. "The Convention" established a standard (also known as D-2 standard) for the ballast water treatment by explicitly stipulating the size and quantity of survivable organisms, and the species and quantity of pathogenic microorganisms in the ballast water as well.

Presently, filtration plus physical or chemical treatment method are used in most of the ballast water treatment systems to inactivate organisms. In the filtration technology, a filter with a filtering accuracy of 50 μm or 40 μm is typically used to remove the organisms or particulate matters with large particles, which leads a large amount of marine organisms being adhered to the filter screen. Due to the ballast water treatment system for ships are only used when loading or discharging the ballast water, that is to say, the ballast water treatment system are intermittently used. During the shutdown of the system, the organisms adhered to the filter screen will multiply, and eventually clog the filter, which is known as fouling problem of the filter.

At present, there is not fully automatic online antifouling method and apparatus at home and abroad, for solving the fouling problem of the filter, and the fouled filter can only be removed and cleaned by hand.

SUMMARY

Accordingly, the present invention provides an online antifouling ship ballast water treatment system and a ship ballast water treatment method.

The online antifouling ship ballast water treatment system provided by the present invention includes a ballast water main pipeline, a ballast water branch pipeline, a dispensing pipeline, a filter located on the ballast water main pipeline, an electrolytic unit located on the ballast water branch pipeline, and a dispensing pump located on the dispensing pipeline. A portion of seawater introduced into the ship ballast water treatment system is filtered by the filter and pumped to the ballast water branch pipeline and the electrolytic unit. A portion of seawater electrolyzed by the electrolytic unit is introduced back to the ballast water main pipeline through the ballast water branch pipeline. A portion of seawater electrolyzed by the electrolytic unit is introduced back to the filter through the dispensing pipeline and the dispensing pump after a process of loading the ballast water is finished, and is kept in the filter for a certain period of time.

According to one embodiment of the present invention, the ballast water branch pipeline has a dehydrogenation tank disposed thereon and located at downstream of the electrolytic unit. The seawater electrolyzed by the electrolytic unit is introduced back to the ballast water main pipeline through action of another dispensing pump after the seawater is dehydrogenated by the dehydrogenation tank.

According to one embodiment of the present invention, an atomizing spray is disposed at a center of an upper portion of the dehydrogenation tank, and the dehydrogenation tank further includes flow stirring modules disposed at middle and bottom of the dehydrogenation tank.

According to one embodiment of the present invention, a first valve and a second valve are disposed on the ballast water branch pipeline. The first valve is located between the ballast water main pipeline and an inlet of the electrolytic unit. The second valve is located between the another dispensing pump and the ballast water main pipeline. The first valve, the second valve, and the another dispensing pump are turned on during the process of loading the ballast water.

According to one embodiment of the present invention, the dispensing pipeline is located between the ballast water main pipeline and a waste discharging outlet of the filter. A joint of the ballast water main pipeline and the dispensing pipeline is located at downstream of a joint of an outlet of the ballast water branch pipeline and the ballast water main pipeline.

According to one embodiment of the present invention, a third valve and a fourth valve are disposed on the dispensing pipeline. The dispensing pump is located between the third valve and the fourth valve. The third valve and the fourth valve are turned off during the process of loading the ballast water, and turned on during a dispensing process which is performed after the loading process is finished and turned off when the dispensing pump is stopped.

According to one embodiment of the present invention, the dispensing pipeline is connected to a waste-discharging pipeline through a tee connector. The dispensing pipeline includes a first electromagnetic valve disposed between the tee connector and the fourth valve. The waste-discharging pipeline includes a second electromagnetic valve located at downstream of the tee connector. The first electromagnetic valve is turned off during the loading process and turned on during the dispensing process, the second electromagnetic valve is turned on during the loading process and turned off during the dispensing process.

The ship ballast water treatment method provided by the present invention includes the following steps: disposing a dispensing pipeline between a waste discharging outlet of a filter and a ballast water main pipeline of a ship ballast water treatment system, and disposing a dispensing pump on the dispensing pipeline; turning on the dispensing pump after a process of loading ballast water is finished, and pumping a portion of seawater electrolyzed by an electrolytic unit of the ship ballast water treatment system from the ballast water main pipeline by the dispensing pump, and introducing the seawater from the dispensing pipeline back into the filter through the waste discharging outlet of the filter; and keeping the introduced seawater in the filter until a next loading operation.

According to one embodiment of the present invention, a third valve and a fourth valve are disposed on the dispensing pipeline. The dispensing pump is located between the third valve and the fourth valve. In the ship ballast water treatment method, the third valve and the fourth valve are turned on when the dispensing pump is activated.

According to one embodiment of the present invention, the dispensing pipeline is connected to a waste-discharging pipeline through a tee connector. The dispensing pipeline includes a first electromagnetic valve disposed between the tee connector and the fourth valve. The waste-discharging pipeline includes a second electromagnetic valve disposed at downstream of the tee connector. The ship ballast water treatment method further includes: turning off the first electromagnetic valve and turning on the second electromagnetic valve before the process of loading the ballast water is started, and turning on the first electromagnetic valve and turning off the second electromagnetic valve after the process of loading the ballast water is finished.

Techniques provided in embodiments of the present invention have the following advantages:

In the ship ballast water treatment system and method of the present invention, the TRO solution is introduced back into the filter while ballasting operation finished and kept in the filter until the next ballasting operation start. Therefore, the sodium hypochlorite contained in the TRO solution could inhibit the growth and propagation of the marine organisms in the filter during the shutdown of the filter, so as to prevent the clogging of the filter which are caused by mass growth and multiply of the marine organisms adhered to the filter mesh of the filter during the shutdown of the filter.

The aforementioned description is a conceptual overview of the present invention. In order to make the technique of the present invention be clearly understood and enable in accordance with specification, and the above or other aspects, features and advantages of the present invention become apparent, embodiments and detailed descriptions in conjunction with the accompanying drawings are provided hereafter.

DETAILED DESCRIPTION OF PREFERRED EMBODIMENTS

In order to further illustrate the techniques and effect of the present invention adopted for achieving the aspects, exemplary embodiments, structure, features and the effects of the ship ballast water treatment system and method according to the present invention will be described thoroughly in conjunction with the accompanying drawings and the preferred embodiments.

The foregoing or other techniques, features and effects of the present invention will become apparent in the following detailed descriptions of the preferred embodiments in conjunction with the accompanying drawings. In view of descriptions of exemplary embodiments, the techniques and effects of the present invention adopted for achieving aspects will be further and specifically understood. The accompanying drawings are merely used for illustration and description, but not used to limit the present invention.

Figure 1:
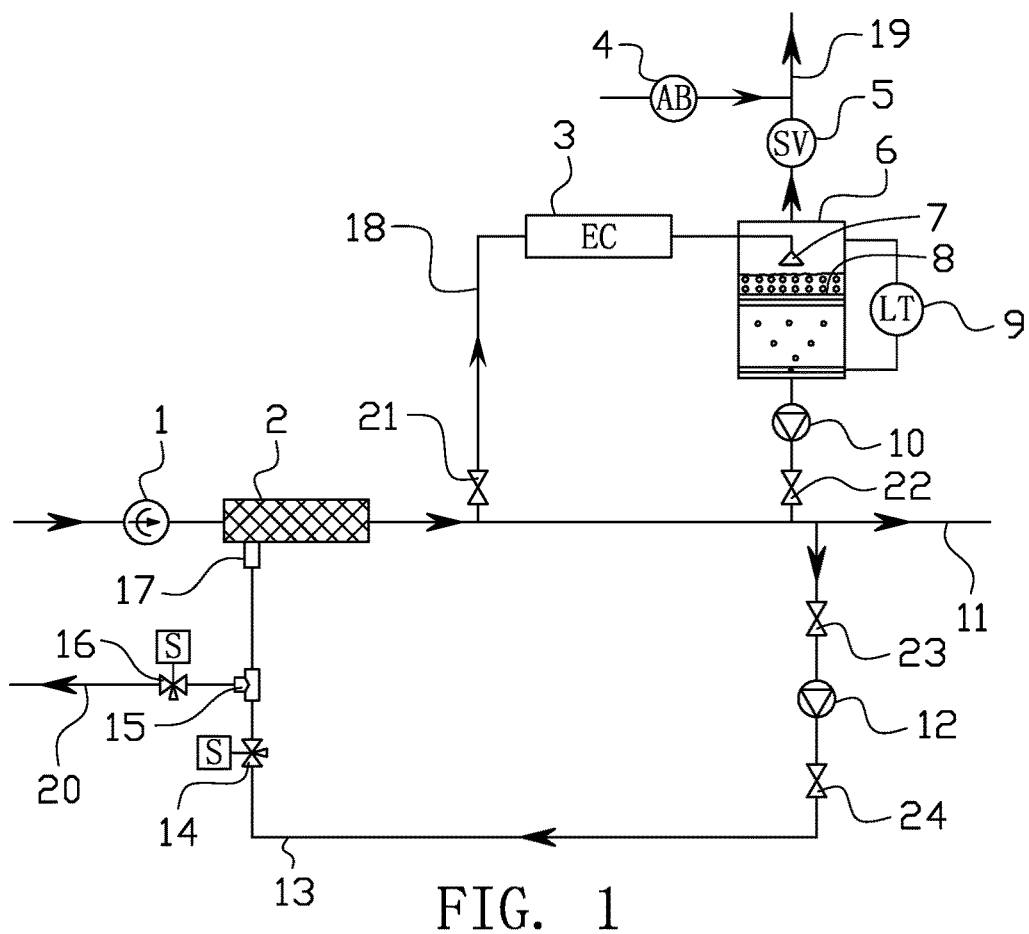
FIG. 1 schematically shows a block diagram of a ballast water treatment system of the present invention.

Please referring to FIG. 1, an online antifouling ship ballast water treatment system according to an embodiment of the present invention includes a ballast water main pipeline 11, a ballast water branch pipeline 18, a hydrogen-discharging pipeline 19, a dispensing pipeline 13 and a waste-discharging pipeline 20, a ballast pump 1 and a filter 2 located on the ballast water main pipeline 11, an electrolytic unit 3, a dehydrogenation tank 6, a first valve 21, a second valve 22 and a first dispensing pump 10 located on the ballast water branch pipeline 18, a gas-liquid separator 5 and an explosion-proof blower 4 located on the hydrogen-discharging pipeline 19, a third valve 23, a fourth valve 24, a second dispensing pump 12, a tee connector 15 and a first electromagnetic valve 14 located on and connected to the dispensing pipeline 13, and a second electromagnetic valve 16 located on the waste-discharging pipeline 20. In one embodiment, the first through the fourth valves 21-24 are preferably manual valves.

Specifically, the ballast pump 1 and the filter 2 are sequentially disposed along and connected to the ballast water main pipeline 11.

The electrolytic unit 3 and the dehydrogenation tank 6 are sequentially disposed along and connected to the ballast water branch pipeline 18, and the joint of the inlet of the ballast water branch pipeline 18 and the ballast water main pipeline 11 is located at the downstream of the filter 2.

The first valve 21 is disposed on and connected to the ballast water main pipeline 18 and located between the ballast water main pipeline 11 and the inlet of the electrolytic unit 3. The electrolytic unit 3 is electrically connected to a control unit (not shown in drawings) of the ship ballast water treatment system, so as to electrolyze seawater under control of the control unit and produce a mixture of TRO solution containing sodium hypochlorite and hydrogen gas.

Figure 3:
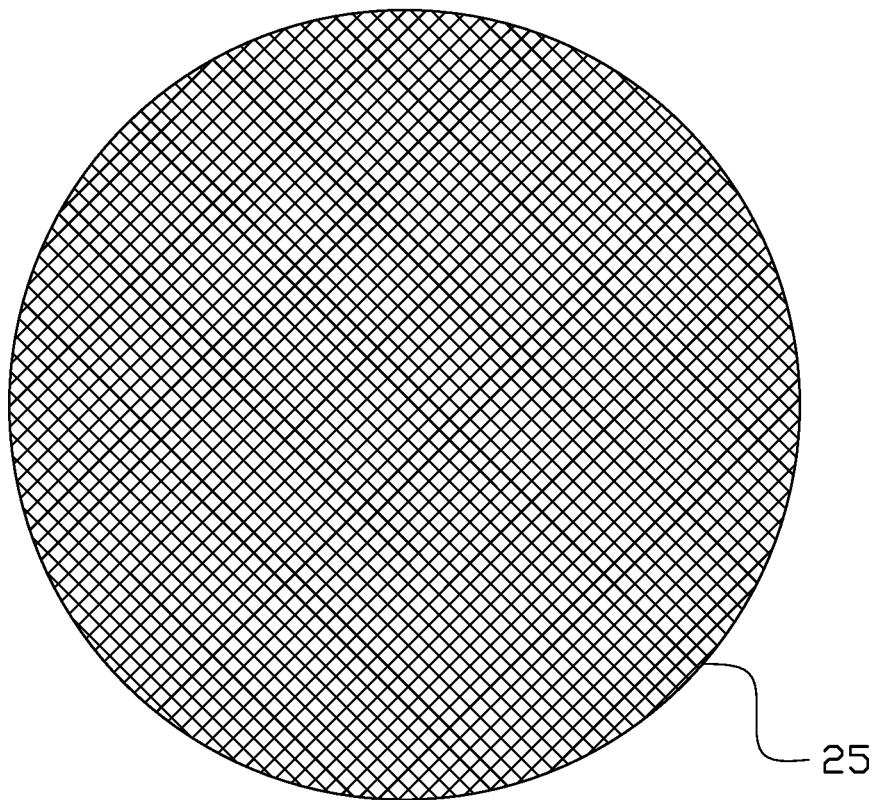
FIG. 3 schematically shows a top view of the flow stirring module illustrated in FIG. 2.
Figure 4:
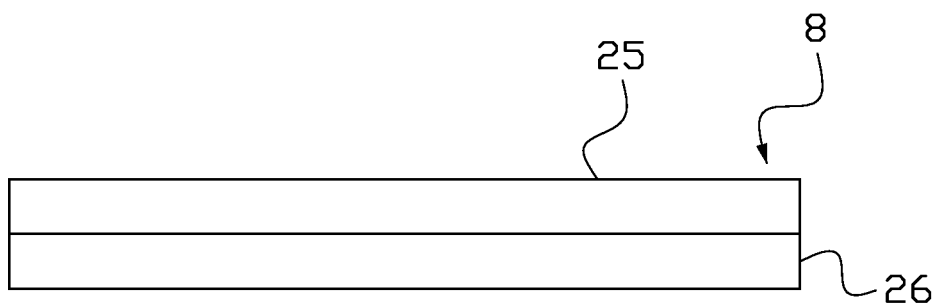
FIG. 4 schematically shows a front view of the flow stirring module illustrated in FIG. 2.

The inlet of the dehydrogenation tank 6 is connected to the outlet of the electrolytic unit 3. Please referring to FIG. 2 to FIG. 4 together, the dehydrogenation tank 6 is made of carbon steel, the volume of the dehydrogenation tank 6 is substantially equals to the amount of TRO solution flowing into the tank within 1 min (for example, if the flow rate of TRO solution is 6 m$^3$/h, the volume of the dehydrogenation tank 6 should be around 100 L), the ratio of the diameter to the height of the tank is preferably 3:4, the thickness of the wall of the tank is approximately 3 to 4 mm, and sealant is applied inside the tank to prevent corrosion caused by TRO solution. A liquid inlet of the dehydrogenation tank 6 is extended across to the center of upper portion of the dehydrogenation tank 6 through a jetting pipeline, an atomizing spray 7 is provided at the liquid inlet of the dehydrogenation tank 6, hydrogen gas mixed with the TRO solution, which is conducted to the dehydrogenation tank 6, can be separated from the TRO solution rapidly through atomization of the atomizing spray 7. The atomizing spray 7 spaces a distance of around 10 cm from the top of the tank in the height direction of the dehydrogenation tank 6, moreover, in order to ensure effect of atomization, the internal pressure of the jetting pipeline and the atomizing spray 7 is preferably in a range of approximately from 3 to 3.5 Bar. After being atomized and sprayed through the atomizing spray 7, most of the hydrogen gas in the TRO solution is removed, but a few of the smaller bubbles is still contained in the TRO solution.

To further increase dehydrogenation efficiency and remove the small bubbles remained in the TRO solution, the present invention further provides two flow stirring modules 8 (respectively called the first flow stirring module and the second flow stirring module hereafter) at the middle and the bottom of the dehydrogenation tank 6. In one embodiment, these two flow stirring modules 8 are both composed of stainless steel mesh, and each includes at least one layer of flow stirring mesh 25 and a support 26 of flow stirring mesh for supporting and fastening the at least one flow stirring mesh 25. In this embodiment, the flow stirring mesh 25 and the support 26 of flow stirring mesh are both made of stainless steel type 316L, and each of the flow stirring modules 8 includes at least two layers of flow stirring mesh 25. Specifically, in one embodiment, each of the flow stirring modules 8 includes three layers of flow stirring mesh 25 and these three layers of flow stirring mesh 25 are fixed and fastened together through the support 26 of flow stirring mesh by soldering. The mesh size of the first flow stirring module is approximately 5 by 5 mm, the mesh size of the second flow stirring module is approximately 2 by 2 mm, each support 26 of flow stirring mesh fixes the corresponding flow stirring meshes 25 together and remains a distance of approximately 10 to 20 mm (preferably 10 mm) between adjacent layers. Understandably, in other embodiments of the present invention, the mesh sizes of the first flow stirring module and the second flow stirring module can be other appropriate numbers only if the mesh size of the first flow stirring module is greater than the mesh size of the second flow stirring module, and both of the first flow stirring module and the second flow stirring module could facilitate to accumulate and separate hydrogen gas from the TRO solution. Definitely, in one embodiment of the present invention, the mesh sizes of the first flow stirring module and the second flow stirring module could equal to each other, for example the mesh sizes both are 5 by 5 mm or 2 by 2 mm.

Figure 2:
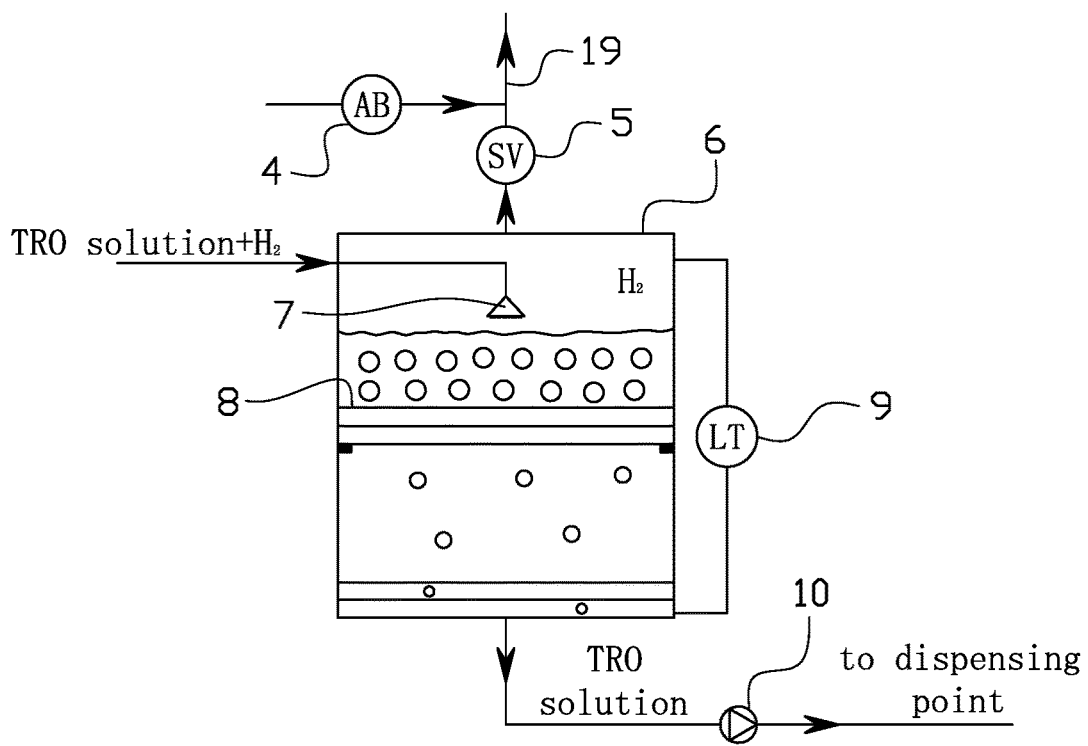
FIG. 2 schematically shows a structural diagram of a dehydrogenation tank provided in the present invention.

Please continue to refer to FIG. 1 and FIG. 2, the gas-liquid separator 5 is disposed on and connected to the hydrogen discharging pipeline 19 and is connected to an air outlet disposed on the top of the dehydrogenation tank 6. The explosion-proof blower 4 is located at the downstream of the gas-liquid separator 5, and the air introduced by the explosion-proof blower 4 is mixed with the gas passing through the gas-liquid separator 5, so that the hydrogen gas separated by the dehydrogenation tank is diluted to a concentration below the explosion threshold, and then discharged over the board of the ships. The first dispensing pump 10 is connected to a liquid outlet at the bottom of the dehydrogenation tank 6, and connected to the ballast water main pipeline 11 through the second valve 22, the dehydrogenated TRO solution is injected into the dispensing point of the ballast water main pipeline 11 through the first dispensing pump 10. In addition, a level gauge 9 is disposed at one side of the dehydrogenation tank 6, the level gauge 9 is capable of remote communicating with the control unit, so that the level of the liquid inside the dehydrogenation tank 6 could be controlled between ½ to ¾ of the total height of the dehydrogenation tank 6 through the cooperation of the control unit, the level gauge 9 and the first dispensing pump 10. In order to better control the level of the liquid inside the dehydrogenation tank 6, the first dispensing pump 10 is preferably a variable frequency dispensing pump.

The second dispensing pump 12, the third valve 23, the fourth valve 24, the tee connector 15 and the first electromagnetic valve 14 are disposed on and connected to the dispensing pipeline 13. The joint of the dispensing pipeline 13 and the ballast water main pipeline 11 is located at the downstream of the joint of the outlet of the ballast water branch pipeline 18 and the ballast water main pipeline 11. The third valve 23 is located close to the ballast water main pipeline 11 and between the ballast water main pipeline 11 and the second dispensing pump 12. The second dispensing pump 12 is located between the third valve 23 and the fourth valve 24. The first electromagnetic valve 14 is located at the downstream of the fourth valve 24, and between the fourth valve 24 and the tee connector 15. The tee connector 15 is located between the first electromagnetic valve 14 and a waste discharging outlet 17 of the filter 2. The second electromagnetic valve 16 is located on the waste-discharging pipeline 20 and connected the tee connector 15 to the outside of the ship.

The operation principle of the ship ballast water treatment system of the present invention is: when the system is loading the ballast water, seawater is pumped into the filter 2 by the ballast pump 1, after the seawater is filtrated through the filter 2, the filtration passes through the waste-discharging outlet 17 of the filter 2, the tee connector 15 and the second electromagnetic valve 16, and then is discharged over the board of the ships, and the filtrated seawater is conducted to the ballast water main pipeline 11. A portion of the seawater in the ballast water main pipeline 11 is introduced directly into the ballast tank while the other portion is conducted to the electrolytic unit 3 and electrolyzed to produce TRO solution and hydrogen gas. The TRO solution mixed with hydrogen gas is transferred to the dehydrogenation tank 6 and the hydrogen gas is separated from the TRO solution by the dehydrogenation tank 6. After the hydrogen gas is further separated through the gas-liquid separator 5, it is mixed and diluted with the air introduced by the explosion-proof blower 4 and is discharged over the board of the ships while the dehydrogenated TRO solution is introduced back into the ballast water main pipeline 11 through the action of the first dispensing pump 10. When the process of loading ballast water is finished (i.e. when the ballast pump 1 stops working), turning on the third valve 23, the fourth valve 24, the first electromagnetic valve 14 and the second dispensing pump 12, and turning off the second electromagnetic valve 16, so that a certain amount of the seawater which was filtrated, electrolyzed and dehydrogenated, is pumped from the ballast water main pipeline 11 by the second dispensing pump 12 and is introduced into the filter 2 through the waste-discharging outlet 17. After the second dispensing pump 12 operates for a certain period, turning off the second dispensing pump 12 and the valves connected to the waste-discharging outlet 17 of the filter 2 (i.e., the third valve 23, the fourth valve 24 and the first electromagnetic valve 14), and keeping the treated seawater in the filter 2 until next loading.

In summary, the ship ballast water treatment system of the present invention includes at least one of the following advantages:

In the ship ballast water treatment system of the present invention, the TRO solution is introduced back into the filter 2 while the ballasting operation finished and kept in the filter 2 until the next ballasting operation start. Therefore, the sodium hypochlorite contained in the TRO solution could inhibit the growth and propagation of the marine organisms in the filter 2 during the shutdown of the ballast pump 1, so as to prevent the clogging of the filter 2 which are caused by mass growth and multiply of the marine organisms adhered to the filter mesh of the filter 2 during the shutdown of the filter 2.

In the end, exemplary embodiments are provided hereafter to describe the achievements of the present invention:

Exemplary Embodiment One

The antifouling technique of the present invention is used in a chemical cargo ship of 72000 DWT, whose rated treatment amount of the ballast pump 1 is 2000 m$^3$/h. The arrangement of the present ship ballast water treatment system is shown in FIG. 1.

In the ship ballast water treatment system, a tee connector 15 is disposed at the waste discharging outlet 17 of the filter 2. When the process of loading ballast water is finished (i.e. when the ballast pump 1 stops working), a certain amount of the seawater, which was filtrated and electrolyzed by the electrolytic cell 3, is pumped from the ballast water main pipeline 11 by the second dispensing pump 12 and is introduced into the filter 2 through the dispensing pipeline 13 and the tee connector 15. After the second dispensing pump 12 operates for three minutes, turning off the valves connected to the waste discharging outlet 17 of the filter 2 (i.e., the third valve 23, the fourth valve 24 and the first electromagnetic valve 14) while the dispensing pump 12 stops working, and keeping the treated seawater in the filter 2 until next loading.

After the ballast water treatment system being used in the ships for two years, the filter 2 is never clogged up or the filtration capability of the filter 2 is never weakened because of the fouling of the filter 2. The filter 2 is opened and checked after two years, there is not organisms being adhered to the filter mesh of the filter 2, and therefore, there is no need to clean the filter mesh of the filter 2 by hand.

Exemplary Embodiment Two

The antifouling technique of the present invention is used in an ore ship of 35000 DWT, whose rated treatment amount of the ballast pump 1 is 4000 m$^3$/h. The arrangement of the present ship ballast water treatment system is shown in FIG. 1.

In the ship ballast water treatment system, a tee connector 15 is disposed at the waste discharging outlet 17 of the filter 2. When the process of loading ballast water is finished (i.e. when the ballast pump 1 stops working), a certain amount of the seawater, which was filtrated and electrolyzed by the electrolytic cell 3, is pumped from the ballast water main pipeline 11 by the second dispensing pump 12 and is introduced into the filter 2 through the dispensing pipeline 13 and the tee connector 15. After the second dispensing pump 12 operates for four minutes, turning off the valves connected to the waste discharging outlet 17 of the filter 2 (i.e., the third valve 23, the fourth valve 24 and the first electromagnetic valve 14) while the dispensing pump 12 stops working, and keeping the treated seawater in the filter 2 until next loading.

After the ballast water treatment system being used in the ships for two years, the filter 2 is never clogged up or the filtration capability of the filter 2 is never weakened because of the fouling of the filter 2. The filter 2 is opened and checked after two years, there is not organisms being adhered to the filter mesh of the filter 2, and therefore, there is no need to clean the filter mesh of the filter 2 by hand.

Exemplary Embodiment Three

The antifouling technique of the present invention is used in a bulk ship of 18000 DWT, whose rated treatment amount of the ballast pump 1 is 3000 m$^3$/h. The arrangement of the present ship ballast water treatment system is shown in FIG. 1.

In the ship ballast water treatment system, a tee connector 15 is disposed at the waste discharging outlet 17 of the filter 2. When the process of loading ballast water is finished (i.e. when the ballast pump 1 stops working), a certain amount of the seawater, which was filtrated and electrolyzed by the electrolytic cell 3, is pumped from the ballast water main pipeline 11 by the second dispensing pump 12 and is introduced into the filter 2 through the dispensing pipeline 13 and the tee connector 15. After the second dispensing pump 12 operates for five minutes, turning off the valves connected to the waste discharging outlet 17 of the filter 2 (i.e., the third valve 23, the fourth valve 24 and the first electromagnetic valve 14) while the dispensing pump 12 stops working, and keeping the treated seawater in the filter 2 until next loading.

After the ballast water treatment system being used in the ships for two years, the filter 2 is never clogged up or the filtration capability of the filter 2 is never weakened because of the fouling of the filter 2. The filter 2 is opened and checked after two years, there is not organisms being adhered to the filter mesh of the filter 2, and therefore, there is no need to clean the filter mesh of the filter 2 by hand.

The descriptions above are embodiments of the present invention only and are not used, by any way, to limit the present invention. Although the present invention has been described with reference to the above embodiments, those embodiments are not used to limit the present invention, it will be apparent to anyone of ordinary skill in the art that slight changes or modifications to the described embodiments may be made to become equivalent embodiments without departing from the technique scope of the present invention. On the contrary, any slight and simple changes, equivalent variations and modifications according to the disclosure of the present invention should fall within the technique scope of the present invention.

INDUSTRIAL APPLICABILITY

In the ship ballast water treatment system and method of the present invention, the TRO solution is introduced back into the filter while ballasting operation finished and kept in the filter until the next ballasting operation start. Therefore, the sodium hypochlorite contained in the TRO solution could inhibit the growth and propagation of the marine organisms in the filter during the shutdown of the ballast pump, so as to prevent the clogging of the filter which are caused by mass growth and multiply of the marine organisms adhered to the filter mesh of the filter during the shutdown of the filter.

What is claimed is:
1. An online antifouling ship ballast water treatment system, comprising:
 a ballast water main pipeline;
 a ballast water branch pipeline;
 a filter located on the ballast water main pipeline;

an electrolytic unit located on the ballast water branch pipeline;
a dispensing pipeline; and
a dispensing pump located on the dispensing pipeline;
a portion of seawater introduced into the ballast water main pipeline of the ship ballast water treatment system being filtered by the filter and pumped to the ballast water branch pipeline and the electrolytic unit, a portion of seawater electrolyzed by the electrolytic unit being capable of being introduced back to the ballast water main pipeline through the ballast water branch pipeline, a portion of seawater electrolyzed by the electrolytic unit being capable of being introduced back to the filter through the dispensing pipeline and the dispensing pump after a process of loading the ballast water is finished, and being kept in the filter for a certain period of time;
wherein the dispensing pipeline is located between the ballast water main pipeline and a waste discharging outlet of the filter, a joint of the ballast water main pipeline and the dispensing pipeline is located at downstream of a joint of an outlet of the ballast water branch pipeline and the ballast water main pipeline;
a first valve and a second valve are disposed on the dispensing pipeline, the dispensing pump is located between the first valve and the second valve;
the dispensing pipeline is connected to a waste-discharging pipeline through a tee connector, the dispensing pipeline comprises a first electromagnetic valve disposed between the tee connector and the second valve, the waste-discharging pipeline comprises a second electromagnetic valve located at downstream of the tee connector.

2. The online antifouling ship ballast water treatment system of claim 1, wherein a dehydrogenation tank is disposed on the ballast water branch pipeline and located at downstream of the electrolytic unit, the seawater electrolyzed by the electrolytic unit being introduced back to the ballast water main pipeline through action of another dispensing pump after the seawater is dehydrogenated by the dehydrogenation tank.

3. The online antifouling ship ballast water treatment system of claim 2, wherein an atomizing spray is disposed at a center of an upper portion of the dehydrogenation tank, and the dehydrogenation tank further comprises flow stirring modules disposed at middle and bottom of the dehydrogenation tank.

4. The online antifouling ship ballast water treatment system of claim 2, wherein a third valve and a fourth valve are disposed on the ballast water branch pipeline, the third valve is located between the ballast water main pipeline and an inlet of the electrolytic unit, the fourth valve is located between the another dispensing pump and the ballast water main pipeline, the third valve, the fourth valve, and the another dispensing pump are turned on during the process of loading the ballast water.

5. The online antifouling ship ballast water treatment system of claim 2, wherein the another dispensing pump is located on the ballast water branch pipeline and at downstream of the dehydrogenation tank.

6. The online antifouling ship ballast water treatment system of claim 2, wherein further comprises a hydrogen-discharging pipeline connected to the ballast water branch pipeline, for discharging hydrogen gas separated from a TRO solution by the dehydrogenation tank to outside of the ship.

7. The online antifouling ship ballast water treatment system of claim 6, wherein a gas-liquid separator is located on the hydrogen-discharging pipeline and connected to an air outlet disposed on the top of the dehydrogenation tank, for separating gas and liquid contained in the hydrogen gas separated from the TRO solution.

8. The online antifouling ship ballast water treatment system of claim 7, wherein an explosion-proof blower is located at downstream of the gas-liquid separator, air introduced by the explosion-proof blower is mixed with gas passing through the gas-liquid separator to diluted the hydrogen gas separated by the dehydrogenation tank to a concentration below an explosion threshold of the hydrogen gas.

9. The online antifouling ship ballast water treatment system of claim 1, wherein the first valve and the second valve are turned off during the process of loading the ballast water, and turned on during a dispensing process which is performed after the loading process is finished and turned off when the dispensing pump is stopped.

10. The online antifouling ship ballast water treatment system of claim 9, wherein the first electromagnetic valve is turned off during the loading process and turned on during the dispensing process, the second electromagnetic valve is turned on during the loading process and turned off during the dispensing process.

11. An online antifouling ship ballast water treatment method, comprising the following steps:
disposing a dispensing pipeline between a waste discharging outlet of a filter and a location of a ballast water main pipeline of a ship ballast water treatment system which locates at downstream of the filter, and disposing a dispensing pump on the dispensing pipeline;
turning on the dispensing pump after a process of loading ballast water is finished, and pumping a portion of seawater electrolyzed by an electrolytic unit of the ship ballast water treatment system to the dispensing pipeline from the ballast water main pipeline by the dispensing pump, and introducing the seawater from the dispensing pipeline back into the filter through the waste discharging outlet of the filter; and
keeping the introduced seawater in the filter until a next loading operation;
wherein a first valve and a second valve are disposed on the dispensing pipeline, the dispensing pump is located between the first valve and the second valve, in the ship ballast water treatment method, the first valve and the second valve are turned on when the dispensing pump is activated;
the dispensing pipeline is connected to a waste-discharging pipeline through a tee connector, the dispensing pipeline comprises a first electromagnetic valve disposed between the tee connector and the second valve, the waste-discharging pipeline comprises a second electromagnetic valve disposed at downstream of the tee connector;
the ship ballast water treatment method further comprises turning off the first electromagnetic valve and turning on the second electromagnetic valve before the process of loading the ballast water is started;
the ship ballast water treatment method further comprises turning on the first electromagnetic valve and turning off the second electromagnetic valve after the process of loading the ballast water is finished.

12. The ship ballast water treatment method of claim 11, wherein the ship ballast water treatment system comprises a ballast water branch pipeline connected to the ballast water main pipeline, a joint of an inlet of the ballast water branch pipeline and the ballast water main pipeline is located at downstream of the filter, a joint of the ballast water main pipeline and the dispensing pipeline is located at downstream of a joint of an outlet of the ballast water branch pipeline and the ballast water main pipeline, and the electrolytic unit is located on the ballast water branch pipeline.

\* \* \* \* \*